Jan. 5, 1954     R. GROSS     2,665,163
GROUND RELEASE FOR CARGO PARACHUTES
Filed Jan. 28, 1952     3 Sheets-Sheet 1

INVENTOR.
REINHOLD GROSS
BY
ATTORNEYS

Jan. 5, 1954 R. GROSS 2,665,163
GROUND RELEASE FOR CARGO PARACHUTES
Filed Jan. 28, 1952 3 Sheets-Sheet 2
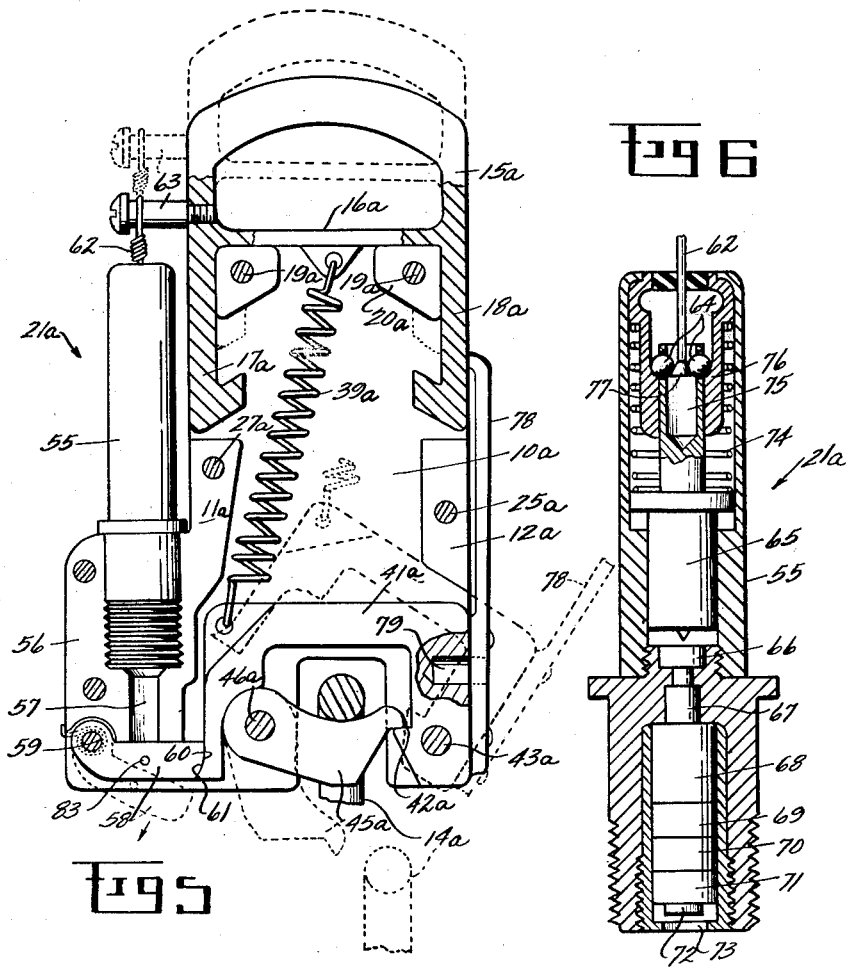

Jan. 5, 1954   R. GROSS   2,665,163
GROUND RELEASE FOR CARGO PARACHUTES
Filed Jan. 28, 1952   3 Sheets-Sheet 3
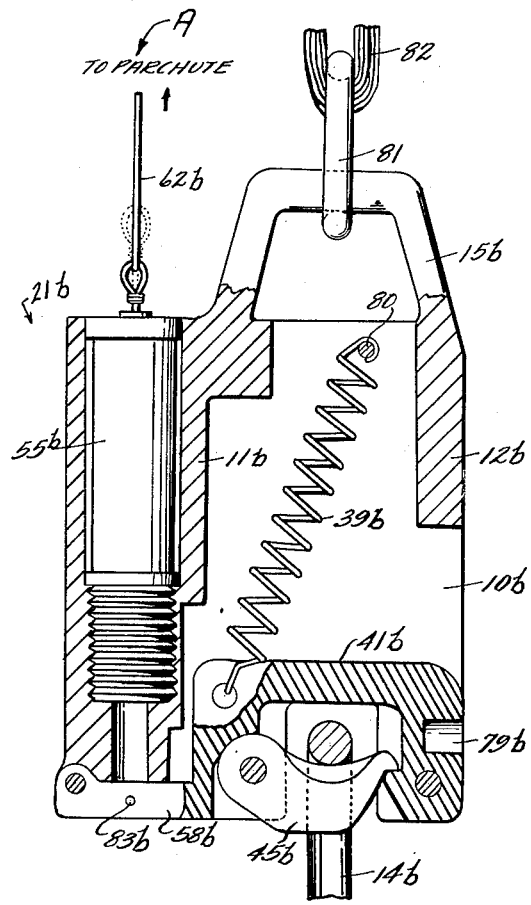
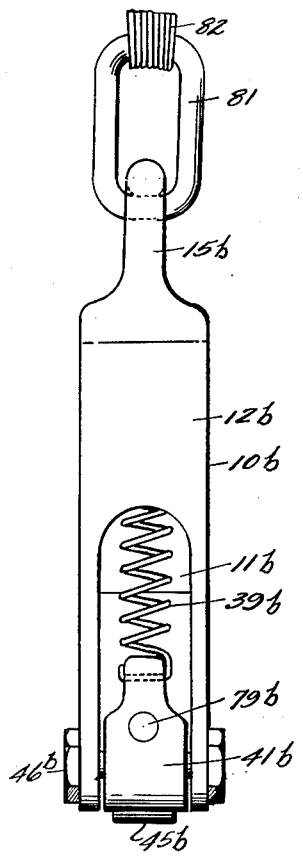
INVENTOR.
REINHOLD GROSS
BY Wade Koontz
Chester Tietig
ATTORNEYS

UNITED STATES PATENT OFFICE 2,665,163

GROUND RELEASE FOR CARGO PARACHUTES

Reinhold Gross, Dayton, Ohio

Application January 28, 1952, Serial No. 268,654

11 Claims. (Cl. 294—83)

(Granted under Title 35, U. S. Code (1952), sec. 266)

The invention described herein may be manufactured and used by or for the Government for governmental purposes without payment to me of any royalty thereon.

This invention relates to an automatic ground release for parachutes, particularly cargo delivery parachutes in which the parachute is retained securely attached to the load and is automatically disconnected to free the parachute from the load upon a predetermined reduction in the pull of the load on the parachute, but only after the parachute has opened and has been subjected to the initial shock load.

The general object of the invention is to provide means for the release of the load or cargo when the ground has been reached. Such action is intended to occur when the load or cargo is only partially supported by the ground, or before the total sustaining pull of the parachute is relieved in order to free the parachute from the load thereby preventing any wind or air currents from becoming effective to upset the deposited load or to drag the cargo over the ground.

Another object is to provide a release which includes a safety feature. This release incorporates a time delay device so that when the initial load application is first made, i. e. the shock loading due to the initial opening of the parachute, the ground release is conditioned for subsequent release upon the reduction of the load or reduction of the sustaining pull below a predetermined minimum. The reason for the time delay mechanism is to prevent the ground release from functioning in the air upon occurrence of reductions in tension between the parachute and the load which might occur when the parachute opens and is initially shock loaded.

Another object of the invention is to provide a basic structure which can be adapted to the mechanical time delay device or to an explosive-actuated time delay device.

Referring now to the accompanying drawing, Fig. 1 is a longitudinal section of the preferred form of the device, i. e. that form which is provided with the mechanical time delay, the automatic ground release being shown in latched condition.

Fig. 5 is a longitudinal section of a modified parachute release showing its loaded position in full line and its released position in dashed lines. This form is shown provided with an explosive actuator.

Fig. 6 is a longitudinal section of the explosive actuator shown in full line in Fig. 5 at the left of that figure.

Fig. 7 is a longitudinal section of a further modified form of the device shown in Fig. 5, the Fig. 7 device being devised with a cord connecting the explosive actuator directly with the parachute so that a movable D-ring as shown in Figs. 1, 2 and 5 is eliminated.

Fig. 8 is an edge view of the device shown in Fig. 7, the view being taken from the right hand edge of Fig. 7.

Figure 1:
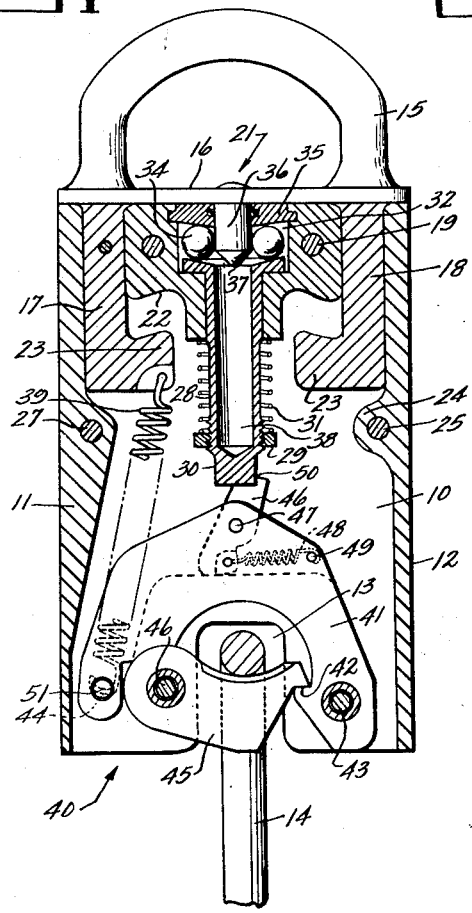
Figure 2:
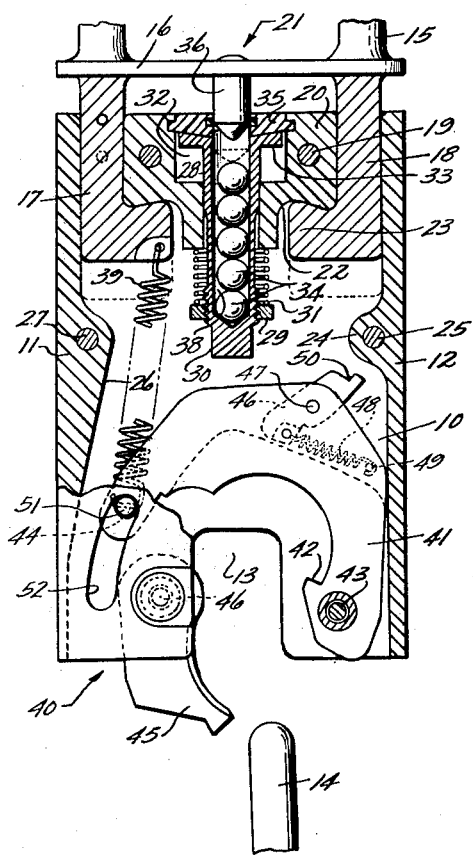
Fig. 2 is a corresponding view of the same device in released position, showing the condition of the time delay device after actuation.

Referring now especially to Figs. 1 and 2, 10 is a body of generally rectangular shape which is provided with side walls 11 and 12 and a cover which is not shown. The body 10 is provided at its lower edge with a cut out portion 13 for the reception of a link 14 to which the load (not shown) is connected. The upper part of the body is provided with a D-ring 15 to which the parachute (not shown) is to be connected. The D-ring 15 raises from the flat bar 16 which acts as a cover for the top of the body 10. The D-ring, the bar and two lugs 17 and 18 are integral. The lugs 17 and 18 fit slidably within the body 10 in contact with the walls 11 and 12. Securely attached to the body by means of pins 19, there is a stop 20 which contains the time delay mechanism indicated generally by 21. The stop is provided with lower shoulders 22 which are curved for the retention of hook portions 23, which are integral with the lugs 17 and 18. The left-hand hook portion 23 is provided at its lower end with a coil spring 39, the purpose of which will be later explained. The wall 12 is provided with an inner boss 24 through which a pin 25 extends to secure the walls to the body 10 and to the cover not shown. A similar boss 26 and pin 27 is provided for wall 11.

The time delay mechanism 21 comprises a thimble 28 the bottom of which is provided with a shoulder 29 and a solid body 30. The thimble 28 is encircled by a coil spring 31, the lower end of which is retained in the shoulder 29 and the upper end at the stop 20 whereby the spring 31 is held in compression so long as the D-ring 15 and its associated parts are in the unextended position shown in Fig. 1. This condition occurs when the parachute release, as a whole, is in the latched condition. The upper part of the thimble 28 fits snugly and slidably in a central aperture 32 in the stop 20. The thimble 28 is provided at its top with a flange 33 which is approximately of the same diameter as the aperture 32 and which is preferably coned inwardly at its top, to a slight degree. The top of the aperture, which is intended to contain a number of steel balls 34 is closed by a likewise preferably inwardly coned stud 35 and is provided with a central opening through which a short cylindrical pin 36 may slide. The pin 36 is riveted through the flat bar 16 at the middle thereof. The lower end of pin 16 is beveled to about a 45° angle, thereby generating a point 37 located near the inner corners generated by the flange 33 at its junction with the central recess 38 on the thimble 28.

Figure 3:
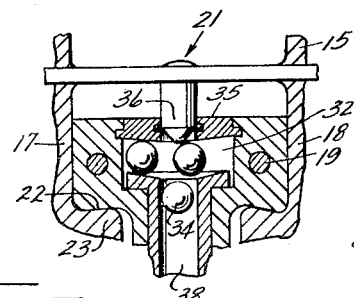
Fig. 3 is a corresponding detail of the time delay device showing how the time is measured by the dropping of steel balls into a recess.

The principle upon which the time delay mechanism 21 operates is that upon the raising of the D-ring and the flat bar 16 the central pin 36 will be raised to open the central recess 38 of the thimble 28 to allow the balls 34 previously interposed between 33 and 35 to drop in the central recess one at a time when released by upward withdrawal of the pin 36. The time delay may be altered in duration by varying the number of balls. The maximum number which may be accommodated in the form shown in Figs. 1, 2 and 3 is 5.

The number is governed by the dimensions of the cooperating parts.

When the last ball 34 has entered a central recess 38, an empty space exists between the flange 33 and the stud 35. This enables the thimble 28 to move upwardly until the flange 33 and stud 35 are in contact as shown in Fig. 2 and free the latching lever 41. The latching mechanism generally indicated by 40 comprises a U-shaped latching lever 41 which is provided with a notch 42 on its inner side. The lever 41 is pivoted about a pin 43. On its left or unpivoted side it is provided with an anchorage 44 for the spring 39 which connects with the hook portion 23 of the lug 17. A latch 45 is pivoted at its left end 46 and is engageable with the notch 42 when the lever 41 is in the position shown in Fig. 1. At the top portion of the lever 41 there is a trigger 46 which is pivoted about a pin 47 and which bears a notch 50 which can be clearly seen in Fig. 2. When the lever 41 is in the position shown in Fig. 1 the trigger 46 engages the solid portion 30 of the thimble 28, holding the U-shaped latching lever 41 down, whereby the latch is locked. A spring 48 which connects the lower end of the lever 46 with a pin 49 is slightly tensioned.

Referring now to Fig. 2, the time delay mechanism 21 has functioned as has been previously explained, the balls progressively dropping into the central recess 38. This functioning, particularly the freeing of the thimble 28 has freed the trigger from its retaining contact with the solid portion 30. The pull of the parachute has raised the D-ring 15 and its associated parts, thereby exerting a considerable pull on the spring 39, thereby enabling the tension on the spring 39 to lift the lever 46 and pivot it about the pin 43. This operation disengaged the latch 45 from the notch 42 as soon as the load on link 14 was lifted off the latch, thereby allowing the load link 14 to drop out of the cut out portion 13. The load is therefore fully disengaged as indicated by the portion of the link 14 in Fig. 2.

Figure 4:
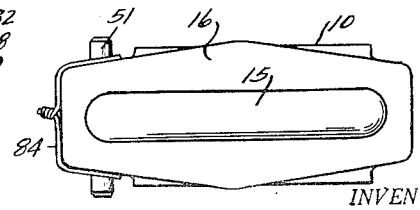
Fig. 4 is a plan view of Figs. 1 and 2 taken from the D-ring or parachute end.

Resetting of the lever 46 and latch 45 to the locked position may be accomplished by resetting the link 14 in the cut out portion 13 pushing the latch 45 upwardly with the thimble while pulling down with the fingers on the pin 51. This pin is best seen in Fig. 4 which is slidable the full length of a slot 52 which is visible in Fig. 2. When pin 51 reaches the bottom of slot 52, the D-ring may be pushed down with the hand thereby allowing the stud 35 to push upon the stack of balls 34 and extend the thimble 28, thereby bringing it into contact with notch 50. This enables the thimble 28 to hold the latching lever 41 in position. D-ring 15 is then pulled upward against the tension of the spring 39 while holding jaw 41 closed and the entire device is inverted so that the balls 34 may drop out of the central recess 37 and resume the position shown in Fig. 1. The D-ring 15 is then released while the device is still inverted so that the stud 35 will prevent the balls falling into the recess when the device is again righted, until the unlatching cycle has been repeated and balls will now hold thimble down and latch lever 46 will hold the latching jaw 41 closed.

Referring now to Fig. 5 in which similar parts to those in Figs. 1 to 4 will be given the exponent "a," the general organization is the same as shown in Figs. 1 and 2, however the time delay mechanism 21a is here explosive actuated instead of being mechanically actuated. The explosive actuator 55a is per se not the invention of the present inventor, but is a conventional device used by the U. S. Army Ordnance Department. This actuator is threadedly retained in the parachute ground release in an extension 56a shown on the left hand side, body 10a and cooperating with the side wall 11a. Within the extension 56a there is a channel 57 which leads downward from the the actuator 55a to the atmosphere. The channel 57 is closable by a detent which is pivoted on the pin 59. The outer edge 60 of the detent 58 is curved to fit the curved surface of the U-shaped lever 41a, which here has a square design shown on Figs. 1 and 2. The pivoted end 61 of lever 41a is thickened at its extreme outer end so that when the parts cooperate as shown in full line in Fig. 5, the detent operates to prevent the lever 41a being raised in response to the pull of the coil spring 39a which is indirectly attached to the flat bar 16a. It is evident therefore, that a sharp blow, exerted through the channel 57, would be able to push the detent 58 past the thickened portion 61 of lever 41a to a position shown in dashed line. The swing of the detent is indicated by a small arrow. The explosive actuator is set into operation by the upper pull on the wire 62 which is attached to a stud 63 which is threadedly engaged in the side of the D-ring 15a. When the D-ring is pulled upwardly in relation to the body 10a by the weight of the load and the pull of the parachute, the wire 62 is pulled free, as may be seen in Fig. 6, of the two steel balls 64 which lock a striker 65 out of contact with a primer 66 which is in contact through a channel 67 with a succession of charges of powder. The first of such charges 68 is comparatively slow burning, the latter ones 69, 70 and 71 becoming progressively faster burning until when the entire train of charges have been burned, a button 72 is ejected from a lower orifice 73 with considerable violence. The initial force for the striker is provided by a coil spring 74. This spring is kept under compression as long as a thimble 75 is kept in locked relation to a sleeve 76, by reason of the position of the steel balls 64, which are also detained by a small cone 77 on the end of the wire 62.

As soon as a detent 58 is explosively disengaged from the lever 41a, the latter flies upward to the position shown in dashed lines in Fig. 5, thereby releasing the latch 45ᵃ in the load link 14ᵃ with its associated load (not shown). Explosion of the actuator 55ᵃ blows the detent outwardly about its pivot 59, thus releasing lever 41ᵃ and latch 45ᵃ. The lever 41ᵃ may be provided with a cocking piece 78. If such a cocking piece is not employed, a recess 79 may alternatively be drilled in the right hand side of the lever 41ᵃ for the insertion of a large nail or some such piece of rod to facilitate manual return of the lever 41ᵃ to the position shown in full line in Fig. 5, at which position the detent 58 may be returned to its locking position against the thickened end 61. For further operation, a freshly loaded actuator 55ᵃ must be supplied.

Referring now to Figs. 7 and 8 in which parts similar to those in Figs. 1 to 4 or 5 and 6 will be given exponents "b," the form therein illustrated is also explosively actuated, but is simplified in that the D-ring 15ᵇ is integral with the body 10ᵇ, and the walls 11ᵇ, and 12ᵇ. Otherwise the organization is quite similar to that of Fig. 5. The spring 39ᵇ is anchored to a pin 80 which is mounted in the body 10ᵇ near the D-ring edge. Since there is no relative movement in this modification of the D-ring and the body 10ᵇ and since relative movement must be provided between the actuator 55ᵇ and the parachute, the actuator initiating wire 62ᵇ is attached either directly to the parachute, which latter however, is not fully shown, or to a looped line (not shown) slackly connecting the parachute with the release. The initial shock loading of the parachute therefore will jerk the wire 62ᵇ and ignite a powder train within the actuator. It is essential that the wire 62ᵇ in the form shown in Figs. 7 and 8 is of such a length that will permit full opening of the parachute in response to initial shock but will not be so long that it will fail to transmit an adequate jerk to the explosive actuator 55ᵇ. In Figs. 7 and 8 the link 81 and the shroud lines 82 symbolically indicate the parachute.

For certainty of operation, it is preferred to wire the detent 58ᵇ in locked position by passing a wire through a small hole 83ᵇ or through the body and detent and twisting it. Such a wire 84 is shown in Fig. 4 but in that construction is passed around the pin 51 so that it may be held at the bottom of the slot 52. Its function is entirely similar to the wire used in connection with the explosive actuator. Tempered steel wire should not be used; soft iron wire or copper wire, which may be readily sheared, is essential.

What is claimed is:

1. In an automatic time delay release device for a parachute, a body, movable means at one end of the body for connecting a parachute thereto, releasable load suspension means at the opposite end of the body having a load-supporting latch pivoted at one end to the body, an inverted U-shaped lever curving above the latch and pivoted to the body adjacent the free end of the latch and formed with a latch supporting notch arranged for releasable supporting engagement with the free end of the latch, said U-shaped lever having its free end disposed adjacent the pivot end of the latch and movable upwardly away from the latch to disengage the said notch from the latch to free the latch and release a load supported thereby, spring means operable between the body and the U-shaped lever for swinging the lever upwardly to latch release position, releasable locking means carried by the body in movement limiting engagement with the U-shaped lever for retaining the lever in latching engagement with the latch including cooperating time delay means for releasing the locking means to free the U-shaped lever for subsequent release actuation by the spring means and means operable by relative movement between the parachute connectable movable means and the time delay means for initiating the operation of the time delay means, whereby the time delay means retains the load supporting latch in load supporting position and the time delay means initiated into operation by pull between a parachute connected to the parachute connectable movable means, and after a predetermined time delay the load supporting latch is released, the downward pull of the load suspended thereby urging the free end thereof downwardly to hold the U-shaped lever from latch release movement against the action of said spring means and upon subsequent predetermined reduction in the pull of suspended load on the latch the spring means becomes operative to rock the lever upwardly to release the latch and free the suspended load therefrom.

2. In a releasing device for a parachute, a body, means slidable upwardly in said body adapted for connection to a parachute, spring means restraining said upwardly slidable means from sliding upwardly during no-load condition, a U-shaped lever pivoted at one end thereof in the lower part of said body and movable upwardly, said lever having a latch supporting notch upon its inner surface adjacent its pivot, a load supporting latch pivoted at one end thereof to the body adjacent the free end of the lever, the other end thereof adapted to engage said latch supporting notch, time delay actuated release means for initially holding said U-shaped lever in latch supporting position in which it furnishes support for the free end of the latch when engaging the latch notch, spring means within the body for swinging said U-shaped lever upwardly about its pivot to disengage the latching notch from the latch, said time delay actuation means being rendered operative by upward movement of said slidable means in response to the application of opposing pull of a suspended load and a supporting parachute connected respectively to the said load supporting latch and said upwardly slidable means.

3. In a releasing device for a parachute, a body including sidewalls, parachute connecting means slidable upwardly in said body adapted to be connected to a sustaining parachute, spring means restraining said parachute connecting means from sliding upwardly when there is no parachute-induced tug on said parachute connecting means, a substantially U-shaped lever pivoted at one end thereof at lower part of said body, said lever having a latching notch upon its inner surface, said spring means being anchored to that end of said U-shaped lever which is furthest from the pivoting point, a trigger pivoted at substantially the highest point of said U-shaped lever when said latch is closed, a time delay device of the ball-escapement type, spring means for placing said time delay device in holding contact with said trigger when said latch is closed and means including a stud movable upwardly with said parachute connecting means for initiating the movement of the balls in said time delay device whereby to release eventually, said device from holding contact with said trigger thereby permitting pivoting of said U-shaped lever to disengage said latch from said notch.

4. In a releasing device for a parachute, a body, parachute connecting means adapted to be connected to a sustaining parachute including a ring and lugs both slidable upward in said body, a latching means including a U-shaped lever pivoted at one end in the lower part of said body for supporting a load to be suspended from the device, latch-locking means including a detent pivoted to said body and engageable with the outer surface of the outer end of said U-shaped lever for retaining said latching means in locked position, and a time delay device comprising an explosive actuator for disengaging said detent from said U-shaped lever after a predetermined time interval and means connecting said explosive actuator and said upwardly slidable ring for initiating said actuator incident to upward movement of the ring.

5. In a releasing device for a parachute, a body including sidewalls and a parachute connecting ring adapted to be connected to a parachute, load supporting means in the lower part of said body, said means including a pivoted load supporting latch, a substantially inverted U-shaped lever having a latch-supporting notch on its inner surface for releasable supporting engagement with the free end of the latch, and having a curved outer end, an extension on said body at one side thereof including means for retaining an explosive time delay actuator, a locking detent pivoted on the lower part of said extension having a free end engaging said curved outer end to retain the free end of the U-shaped lever against latch release movement, said extension including a discharge channel between the upper surface of said detent and said explosive actuator, actuating means for connecting said actuator to the parachute whereby to initiate said explosive actuator upon relative pull between the device and parachute incident to an opening of said parachute, said actuator including time-delay igniting means and a powder charge adapted to be exploded thereby to disengage said detent from contact with said curved outer end of said U-shaped lever, and spring means connected within the said body under predetermined tension when said latch retaining means is locked and operative, upon release of said U-shaped lever by said detent, to pivot said lever upwardly whereby to release said latch upon predetermined reduction in the application of downward pull on the latch by a suspended load carried on the latch.

6. In a parachute release device a generally rectangular body having side walls and a cover, the lower part of said side walls and cover having a cut out portion for the accommodation of a load link; at substantially the top of said body a stop, a D-ring and lugs extending downwardly from said D-ring slidable within said walls to contact said stop, a flat bar extending across the base of said D-ring, a stud extending downwardly from substantially the middle point of said flat bar, a ball escapement type of time delay device mounted through the middle of said stop, said device comprising a thimble movable upwardly within said stop, a coil spring surrounding said thimble biasing said thimble downwardly under a no-load condition of said parachute release, a plurality of steel balls carried within said stop above said thimble under a no-load condition in position to escape into said thimble upon removal upward of said stud under a loaded condition, an arcuate latching lever pivoted at one end thereof to enclose substantially said cut out portion when the releasing device is loaded, said lever having a latching notch on its inner surface, a latch pivoted on that side of said cut out portion which is opposite the pivot for said arcuate lever, biasing means for said arcuate lever as said means being adapted to swing said lever upward upon removal of the load from said release device and a trigger pivoted near the top of said arcuate lever when the latter is in locked condition, and a spring biasing said trigger against the lower end of said thimble when the latter is void of balls, whereby upward movement of said thimble will permit the upward swing of said arcuate lever, the opening of said latch and the release of said load link.

7. In a parachute release device a generally rectangular body having side walls, the lower part of said side walls having a cut out portion for the accommodation of a load supporting link adapted to be connected to a suspended load, an abutment stop fixed at the top of and within the body, a D-ring adapted to be connected to a supporting parachute, lugs extending downwardly from said D-ring slidable within said walls upon limited upward movement of the D-ring to contact said stop, a stud fixed on the D-ring and extending downwardly into the body substantially below the middle point of the D-ring, a ball escapement type of time delay device slidably mounted through the middle of said stop and below the stud, said device comprising a thimble movable upwardly within said stop having a ball receiving opening therein, spring means between the stop and said thimble, biasing said thimble downwardly, a plurality of abutment balls carried within said stop above said thimble and retained by said stud between the stop and thimble from entering the ball receiving opening under a no-load condition, and in position to progressively escape through the ball receiving opening of said thimble upon removal upward of said stud by the D-ring under a loaded condition, an arcuate latching lever pivoted at one end thereof to the body at one side of the cut out portion to extend across to said cut out portion above the same when the releasing device is loaded, said lever having a latching engaging notch on its inner surface adjacent its pivot, a load supporting latch pivoted on that side of said cut out portion which is opposite the pivot for said arcuate lever and swingable to and from a position across the cut out portion, spring biasing means for said arcuate lever adapted to swing said lever and latch upward to free the latch from the notch upon removal of a predetermined portion of the downward pull of the load from said latching lever, a trigger abutment pivoted near the top of and on said arcuate lever and extending upwardly into contact with the lower end of the thimble when the latter is in locked condition, and a spring biasing said trigger against the lower end of said thimble when said thimble end is in contacting position, whereby, when the space between the thimble and the stop is void of balls, upward movement of said thimble by the latching lever and trigger will permit the upward swing of said arcuate lever, the opening of said latch and the release of said load link and when a ball is positioned between the stop and the thimble the thimble is prevented from being moved upwardly by said arcuated lever and retains the arcuate lever in latching engagement with the load supporting latch.

8. In a parachute load release device, for releasing a connected load from a parachute upon a predetermined reduction in the pull of the suspended load on the parachute, said device being connectable intermediate the parachute and the load and comprising a body having connecting means at one end for connection to a parachute and connecting means at its opposite end for connection to a load to be suspended from said parachute, one of said connecting means comprising a load supporting and automatic release means consisting of a load supporting latch pivoted at one end to the body for supporting a load intermediate its ends, a latch release lever pivoted to the body adjacent the free end of the latch when the latch is in load supporting position and extending across the body intermediate the latch means and the other connecting means with its free end located adjacent the pivot of the latch and formed with a latch supporting release shoulder adjacent its pivot for supporting engagement with the free end of the latch, spring means operably connected to the body at one end and to the latch release lever adjacent its free end for swinging the latch release lever away from the latch to disengage the supporting shoulder and free the latch in opposition to an application of a force, such as a predetermined load on the latch intermediate its pivot and its latch lever supported free end, whereby when the applied load on the latch tending to open the same is greater than the effective force of the spring means on the latch release lever tending to move the latch release lever to release position and release the free end of the latch, the applied load through the latch will overcome the opposing force of the spring means and hold the latching lever in latch supporting position and when the applied load on the latch tending to open the latch is reduced to less than the effective opposing force of the spring means on the latching lever tending to move the lever to latch release position, said spring means will swing the latching lever to disengage the supporting shoulder thereof from the free end of the latch and permit the latch to swing outwardly of the body to load release position.

9. In a parachute load release device for automatically disconnecting a parachute from a suspended load upon a predetermined reduction of a portion of the downward pull of the suspended load, a body having connecting means at one end for connection to a parachute and connecting means at its opposite end for connection to a load to be suspended, lowered, and released from the parachute, one of said connecting means comprising a load supporting latch pivoted at one end to the body and having a latching abutment at its free end and arranged to support the suspended load intermediate its pivot and free end, a latch retaining release lever pivoted to the body adjacent the fulcrum of the load supporting latch and extending across the body above the latch to a point adjacent the load supporting latch pivot, said latch retaining release lever having a cooperating supporting abutment positioned for supporting engagement of the latching abutment at the free end of the load supporting latch and swingable within the body away from the load supporting latch to release the free end of the load supporting latch to free the suspended load supported by the latch, and movable in the opposite direction to engage and support the abutment of the load supporting latch to support the latch in load supporting condition, spring means connected between the body and the free end of the latch retaining release lever for swinging the latch retaining release lever within the body to disengage the latch abutment and release the suspended load, removable abutment means movable between the body and the latch retaining release lever for holding the latch retaining release lever in supporting engagement with the load supporting latch abutment to initially retain the said latch lever abutment means in holding relation to the latch release lever to prevent actuation thereof by the spring means to release the load supporting latch upon any reduction in pull of the suspended load, and time delay means carried by the body and arranged to be tripped by initial pull between the parachute and body for subsequently, after a predetermined time delay period, disengage the removable abutment means from the latch retaining lever and free the latch retaining release lever, whereby a subsequent predetermined reduction in downward pull of the suspended load relative to the opposing pull of the parachute permits the spring means to actuate the latch retaining release lever against the remainder of the pull of the suspended load and frees the load supporting latch to permit the load supporting latch to open and release the suspended load from the load supporting latch.

10. In a parachute load release device for automatically disconnecting a suspended load from a supporting parachute, said device being adapted to be connected between the parachute and said suspended load and comprising a body, a load supporting latch pivoted at one end on the body for releasably supporting the said load between the pivot of the latch and its free end and swingable downwardly to release the supported load, a load supporting release lever pivoted at one end on the body adjacent the free end of the latch when the latch is in load supporting position, said lever curving over the top of the latch in spaced relation terminating in a free end adjacent the latch pivot and formed with a latch supporting notch adjacent its pivot for receiving and supporting the free end of the latch in its load supporting position, and swingable upwardly in the body away from the latch to disengage the notch and free the latch for load release operation, spring means operatively connected between the body and the free end of the release lever adjacent the latch pivot for swinging the release lever upwardly to disengage the notch from the latch and free the latch, removable abutment means within the body in the path of upward swinging movement of the release lever to prevent release actuation thereof by the spring means, and time delay actuated means for rendering said abutment means inoperative to resist release movement of the release lever after a predetermined time period, and time delay acting means adapted to be connected to the parachute and operable upon upward pull thereon of the connected parachute to initiate operation of the time delay actuated means; whereby initial pull of a connected parachute will initiate the time delay means to subsequently free the release lever after a predetermined time period and downward pull on the latch by a suspended load thereon, will stress the latch to retain the locking lever in latch retaining position against the force of the spring means and upon predetermined reduction in the pull of the suspended load on the latch, said spring means becomes operative to swing the locking lever upwardly to release the latch and free the suspended load from the supporting parachute.

11. In a releasing device for a parachute, a body, parachute connecting means at the upper end of the body, an inverted U-shaped latch retaining lever pivoted at one end thereof in the lower part of the body and having a latch holding notch on its inner surface adjacent its pivot, a load retaining latch pivoted at one end below the free end of the inverted U-shaped lever and extending thereunder and terminating in a free end disposed for supporting engagement with the latch holding notch and releasable from the notch upon upward swing movement of the lever, spring means within the body for urging the free end of the U-shaped lever upwardly to disengage the retaining notch from the latch to free the latch and release the suspended load upon a reduction in pull of the suspended load on the retaining latch and time actuated holding means carried by the body and operable by relative pull between the suspended load and the parachute, and engaging the U-shaped lever for holding the U-shaped lever in latch retaining position, openable after a predetermined time period to release the U-shaped latch retaining lever.

REINHOLD GROSS.

References Cited in the file of this patent

UNITED STATES PATENTS

| Number | Name | Date |
|---|---|---|
| 2,131,445 | Lawton | Sept. 27, 1938 |
| 2,413,392 | Veverka | Dec. 31, 1946 |
| 2,413,450 | Johnsen | Dec. 31, 1946 |
| 2,420,746 | Heidman et al. | May 20, 1947 |
| 2,435,444 | Johnsen | Feb. 3, 1948 |
| 2,562,459 | Hoey | July 31, 1951 |